US005905447A

United States Patent [19]

Eaton et al.

[11] Patent Number: 5,905,447

[45] **Date of Patent: *May 18, 1999**

[54] SELECTIVE CALL RECEIVER AND METHOD FOR CONVEYING MESSAGE ORIGINATION INFORMATION FOR A SELECTIVE CALL RECEIVER

[75] Inventors: Eric T. Eaton, Lake Worth; Von A. Mock, Boynton Beach, both of Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,857

[22] Filed: Nov. 4, 1996

[51] Int. Cl.[6] .......... H04Q 1/00

[52] U.S. Cl. .......... 340/825.44

[58] Field of Search .......... 340/825.44; 455/38.1, 455/33.2

[56] References Cited

U.S. PATENT DOCUMENTS

| | | | |
|---|---|---|---|
| 4,178,476 | 12/1979 | Frost | 340/825.44 |
| 4,644,347 | 2/1987 | Lucas et al. | 340/825.04 |
| 4,891,638 | 1/1990 | Davis | 340/825.44 |
| 5,666,107 | 9/1997 | Lockhart | 340/825.44 |

OTHER PUBLICATIONS

Advisor Message Receiver. Advertisement of Motorola Pager, 1990.

U.S. Patent Application No. 08/531,362 filed on Sep. 20, 1995 by Lockhart et al., entitled "Method And Apparatus For Efficient Roaming Among Communication Systems".

*Primary Examiner*—Brian Zimmerman
*Attorney, Agent, or Firm*—James A. Lamb

[57] ABSTRACT

A method for conveying message origination information in a selective call receiver comprises selectively receiving a message (300) intended for the call receiver (140). The call receiver (140) identifies if the message received is flawed (302). In response to determining that the message is flawed, the selective call receiver (140) extracts origin information which has been appended to the message (306). The selective call receiver applies the origin information to a look-up table (308) in order to report more detailed information to the subscriber (310) indicating who the subscriber may contact to obtain the complete message.

15 Claims, 5 Drawing Sheets

SELECTIVE CALL RECEIVER AND METHOD FOR CONVEYING MESSAGE ORIGINATION INFORMATION FOR A SELECTIVE CALL RECEIVER

FIELD OF THE INVENTION

This invention relates in general to communication systems, and more specifically to communication systems where messages are sent from a number of different origins.

BACKGROUND OF THE INVENTION

In radio paging systems, a paging subscriber typically obtains service from a service provider in a particular geographic region. For example, a person living in the city of Chicago in the United States typically obtains paging service from a service provider located in Chicago. The service provider typically provides the subscriber with a pager and sets up a subscriber profile in the service provider's computer system which controls the paging network. The subscriber profile is typically a computer record which contains items of information such as a pager identification number, one or more paging addresses associated with the particular pager, types of services and messages subscribed to by the subscriber, for example, alpha-numeric, tone only, voice, data, etc. When someone wishes to page the subscriber the service provider's system utilizes the subscriber profile information to properly format the message to be sent, and to page the subscriber with that message.

Frequently, service providers servicing different geographic areas arrange between one another to permit subscribers of the other provider to roam in their geographic area and facilitate the sending of pages to the roaming subscriber. For example, a service provider in Tokyo, Japan may cooperate with the service provider in Chicago in the United States so that a customer of the Chicago service provider can receive pages in Tokyo.

This roaming gives rise to a particular challenge. Specifically, a person residing in Tokyo may wish to page the subscriber who is roaming in Tokyo. The person wishing to place the page contacts the "local terminal" in Tokyo and provides the message he wishes to send the subscriber. However, the local terminal does not have the subscriber profile information required to properly format and contact the roaming subscriber. Rather, as discussed above, the subscriber profile information resides at the "home terminal" in Chicago. In the past, the message input by the person placing the page, for example that person's phone number, was handed off by the local terminal to the home terminal . The home terminal would format the message and transmit it to the subscriber according to the subscriber profile stored at the home terminal. Consequently, no matter where the person sending the page resided and no matter where the subscriber was located, the home terminal always handled the message including the information to be sent (e.g. the phone number of the person sending the page).

However, a recent advancement in paging systems as disclosed in U.S. Pat. No. 5,666,107 by Lockhart et al. filed Sep. 20, 1995 facilitates the "downloading" of the subscriber profile from the home terminal to the local terminal. Consequently, the local terminal needs to contact the home terminal only for the first page requested by someone in the local area. For subsequent pages, the local terminal has temporarily stored the roaming subscribers profile so that the local terminal can send the page itself.

The advancement in paging systems described gives rise to a particular new challenge. Specifically, a message being sent to the subscriber may "originate" from more than one terminal, i.e., either the subscriber's home terminal or a variety of other local terminals. This contrasts with systems in the past where the message was always ultimately handled by the home terminal. The challenge of the new paging system is that if the subscriber's pager detects that a message it should have received was flawed, for example the received signal was weak and therefore message information was lost, then the subscriber does not know which service provider's terminal he might contact to obtain the message.

Consequently, what is needed is a method and apparatus for conveying message origination information to the subscriber.

DETAILED DESCRIPTION OF THE DRAWINGS

Generally, the preferred embodiment of the present invention involves adding message origination information to a paging message that is to be sent to a subscriber's pager. If the pager detects that the paging message has been received flawed, then the pager uses the message origination information and a look-up table to determine what service provider/terminal sent the message. The service provider's name and phone number, for example, which are stored in the look up table. This information is reported to the subscriber (i.e. displayed on the pager's display) so that the subscriber can call the service provider to obtain the complete message information. In some conventional paging systems the pager knows what service provider area it is located in because each service provider broadcasts a network identification (NID) to all pagers. In such a system the message origination information added to the paging message may be merely one bit, since the pager will know that there are only two possible originations. Those are, the pagers home service provider or the provider servicing the area where the pager is presently located, which the pagers knows from the broadcasted NID. In that case, if the single bit origin information indicates a local rather than home area, then the pager also makes use of the NID in determining from the look-up table which service provider handled the message. Furthermore, in some paging systems the NID is part of or has associated with it a Network System Message (NSM) which includes more detailed information regarding the service provider. For example, the NSM may have the name and phone number of the service provider. In such a system, rather than turn to an internal look-up table for detailed information on the service provider, the pager can obtain all of the detailed information from the broadcasted NSM.

Furthermore, in one preferred embodiment the service providers each keep an independent message counter for messages sent a particular subscriber. This way, when calling in for message information that was received flawed by the pager, the subscriber can refer by number to the particular message needed. Additionally, if the subscriber receives two pages that are not consecutively number, the subscriber will know that a page was missed entirely.

Figure 1:
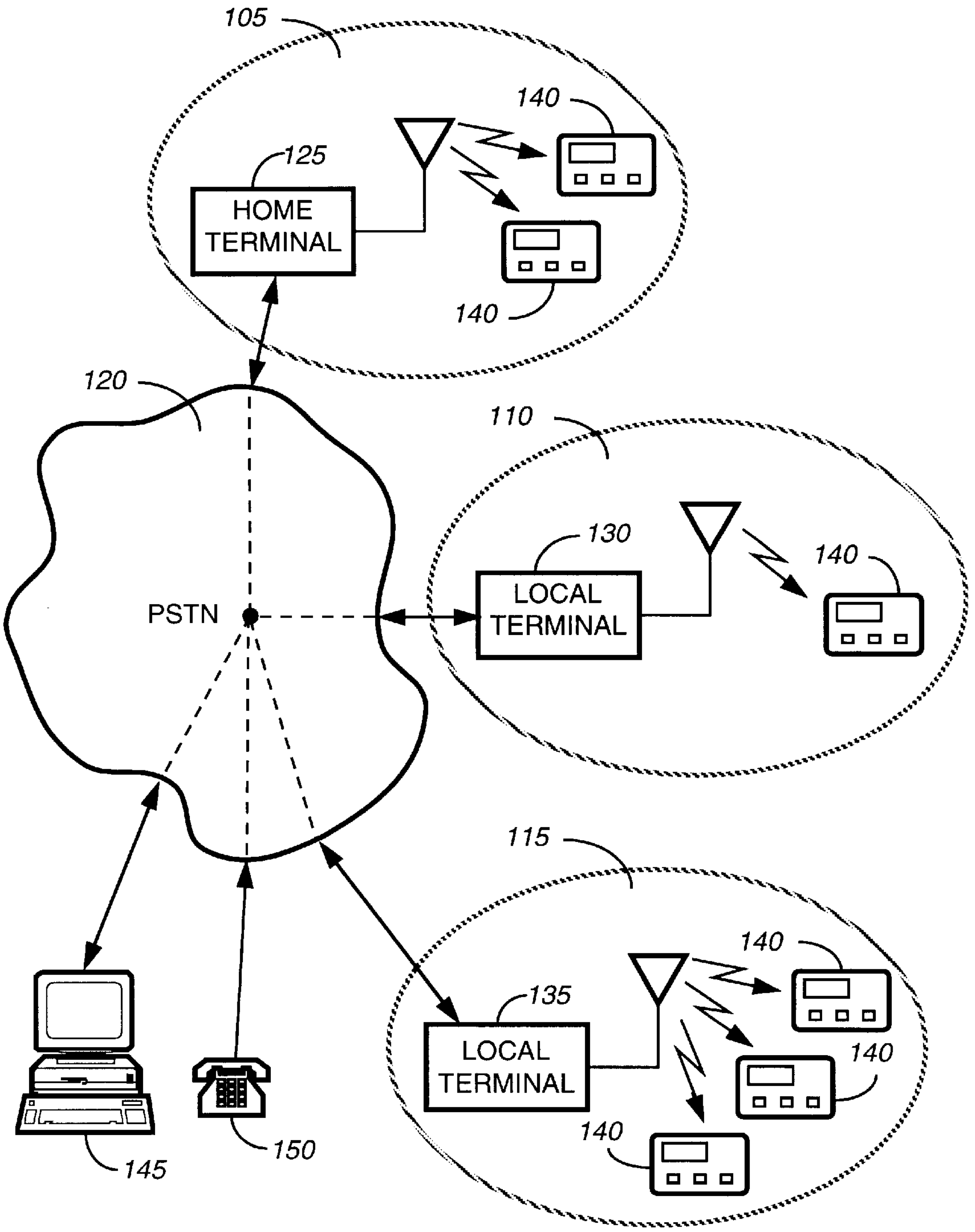
PRIOR ART FIG. 1 100
FIG. 1 is a schematic diagram of the radio paging system including the home geographic area and two local geographic areas where a subscriber may roam.

Turning now to the figures for a more detailed description, FIG. 1 is a diagram of a radio paging system 100 which may take advantage of the present invention. FIG. 1 includes geographic areas 105, 110, and 115. Geographic area 105 represents the subscriber's home geographic area. This geographic area is serviced by the provider with whom the subscriber subscribes. Geographic areas 110 and 115 represent areas remote to the home geographic area. Areas 110 and 115 are serviced by providers who have an arrangement with the providers servicing area 105 so that a subscriber of the provider for 105 may roam in areas 110 and 115 and receive pages.

System 100 further includes public switch telephone network (PSTN) 120. It will recognized that PSTN 120 provides telecommunication links between and among geographic areas 105, 110 and 115.

Each geographic area 105, 110 and 115 includes in message delivery terminal 125, 130 and 135 respectively. Also illustrated in each geographic area are a plurality of subscriber pagers 140. Note that pagers may be referred to generally as a type of selective call receiver, and it will be recognized that it is the general category of selective call receivers to which the present invention applies. For example, there may be selective call receivers found in portable computers or portable phones, etc.. Such selective call receivers are capable of receiving messages, data, information, programming and the like that is targeted for them.

Additionally, system 100 naturally includes terminal devices with which a person wishing to send a page to a subscriber may communicate to one of the message delivery terminals in any particular geographic area. More particularly, a personal computer (PC) 145 may communicate via public switch telephone network (PSTN) 120 to any of the message delivery terminals 125, 130, 135 in order to send a message to a subscriber. Likewise, one wishing to send a page may use telephone 150 to contact a message delivery terminal and provide the message information to be sent, for example, the phone number of that telephone.

As was explained in the background section above, in radio paging system 100 a message sent from telephone 150 or PC 145, for example, may be handled by any one of the message delivery terminals 125, 130 or 135, depending upon the present location of the subscriber. For example, a phone number or alpha-numeric message which originates at telephone 150 or PC 145 may be handled by any of the message delivery terminals 125, 130 or 135. If telephone 150 happens to reside in the subscriber's home geographic area 105 then the subscriber's home terminal 125 will most likely handle the message information regardless of whether the subscriber is in area 105, 110 or 115. Alternatively, if telephone 150 resides in geographic are 115 and the subscriber is roaming in geographic area 115, then local terminal 135 will most likely handle the message information. The challenge arises when the subscriber's pager 140 (the pager also being referred to more generally as a selective call receiver, it being understood that a selective call receiver can take on a great variety of forms much different from portable pagers) receives the page but detects that it has not properly received the message information. In that case, the subscriber may wish to call the message delivery terminal which handled the message because the message information is typically maintained intact at that message delivery terminal. The problem is that the message may have been handled at any of the message delivery terminals. Therefore, the subscriber doesn't know which to contact. As discussed above, in the case where a NID is broadcast in the local area where the pager is roaming, then the pager knows that there are only two possible origins (home or the one identified by the NID), but still doesn't know which of two handled the message.

Figure 2:
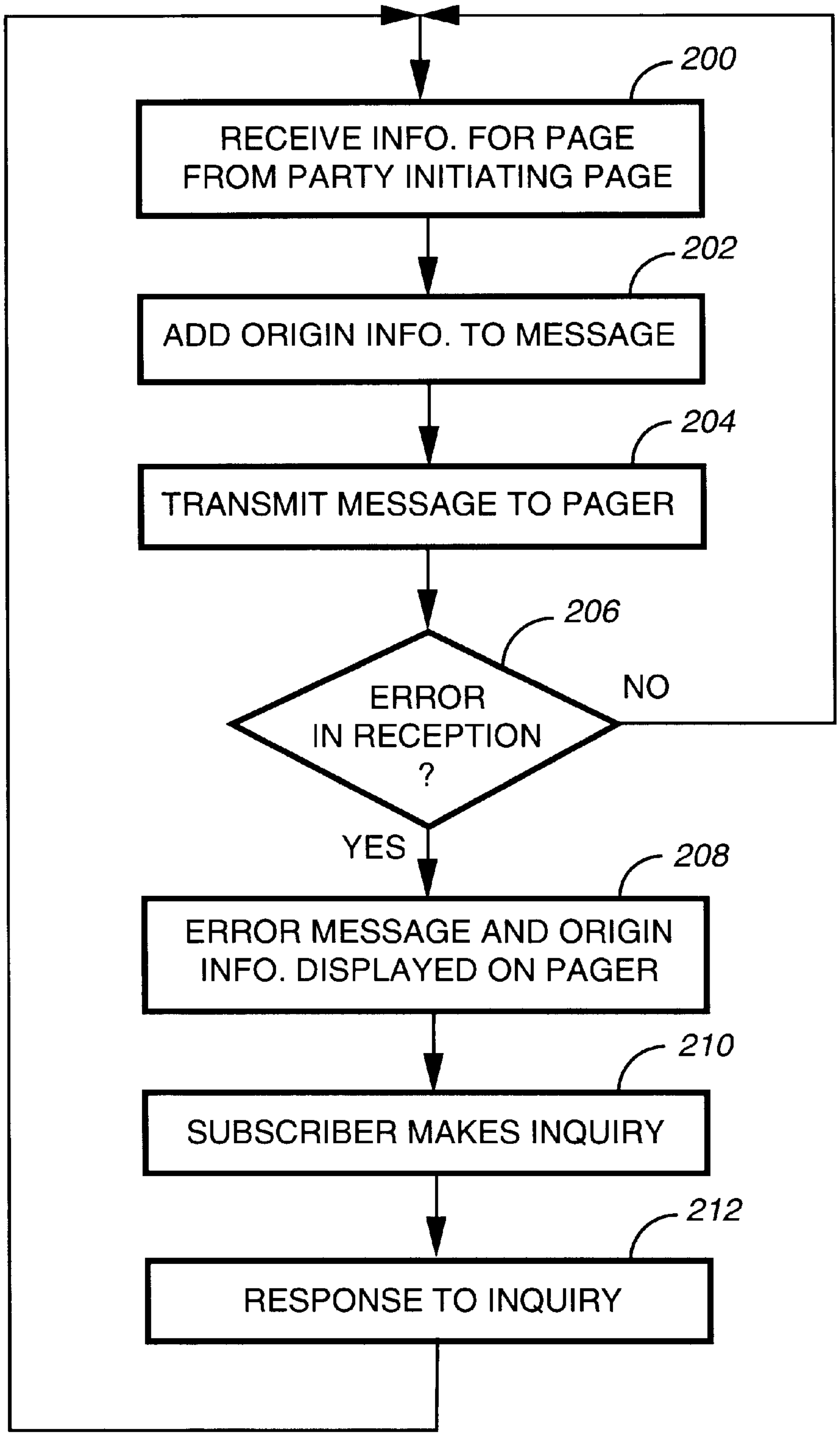
FIG. 2 is a blocked diagram illustrating a method for conveying message origination information from a message delivery terminal.

FIG. 2 is a block diagram illustrating a method consistent with the present invention which resolves the above described problem. FIG. 2 illustrates a preferred group of steps and order of those steps for carrying out the present invention, however, it will be recognized that other steps and alternative ordering of the steps shown would merely be alternative ways to accomplish the invention disclosed herein. At step 200, a message delivery terminal receives information for a page from a party initiating the page. For example, referring briefly back to FIG. 1, a party residing in area 115 may use PC 145 to send an alpha-numeric page to a subscriber roaming in area 115. Returning to FIG. 2, at step 202, local terminal 135 adds "origin information" to the page which will be sent to the subscriber. The origin information may take the form of a series of bits of information, the number of bits being the minimum required to uniquely identify local terminal 135 from the other potential message delivery terminals 125 and 130. Alternatively, as discussed above, the origin information may be as little as a single bit in a system where NIDs are broadcast in each local area.

At step 204, the entire message including the alpha-numeric information and the origin information is sent to the subscriber's pager 140. At step 206, the subscriber's pager 140 identifies whether there has been an error in reception, i.e. whether the message received is flawed. The typical case where the message is flawed is where some of the information in the message, for example some of the numbers of a telephone number, has been lost in the transmission and/or reception of the paging message. There are a variety of known methods for determining whether the received message is flawed, for example with the use of check sums and the like.

If pager 140 does not identify an error in reception then the method illustrated in FIG. 2 returns to step 200 as necessary for further pages. However, if at step 206 pager 140 detects an error in reception, i.e. the received message is flawed, then at step 208 the pager displays an error message and origin information. The origin information displayed will typically be the phone number of the service provider who manages the terminal that originated the message. At step 210 the subscriber telephones the service provider to obtain the information that should have been contained in the message that was flawed when received. At 212 the message delivery terminal responds to the subscriber's inquiry by accessing the message information which was stored at terminal 135 when the party initiating the page sent the original information. Note that when the present description refers to the message delivery terminal responding to the subscriber's inquiry, the responding should be understood to mean the activity that occurs in the electronic and mechanical portions of the terminal when the stored message information is accessed and retrieved. Subsequent to the system responding at step 212, the process may return to step 200 as necessary for further pages.

Figure 3:
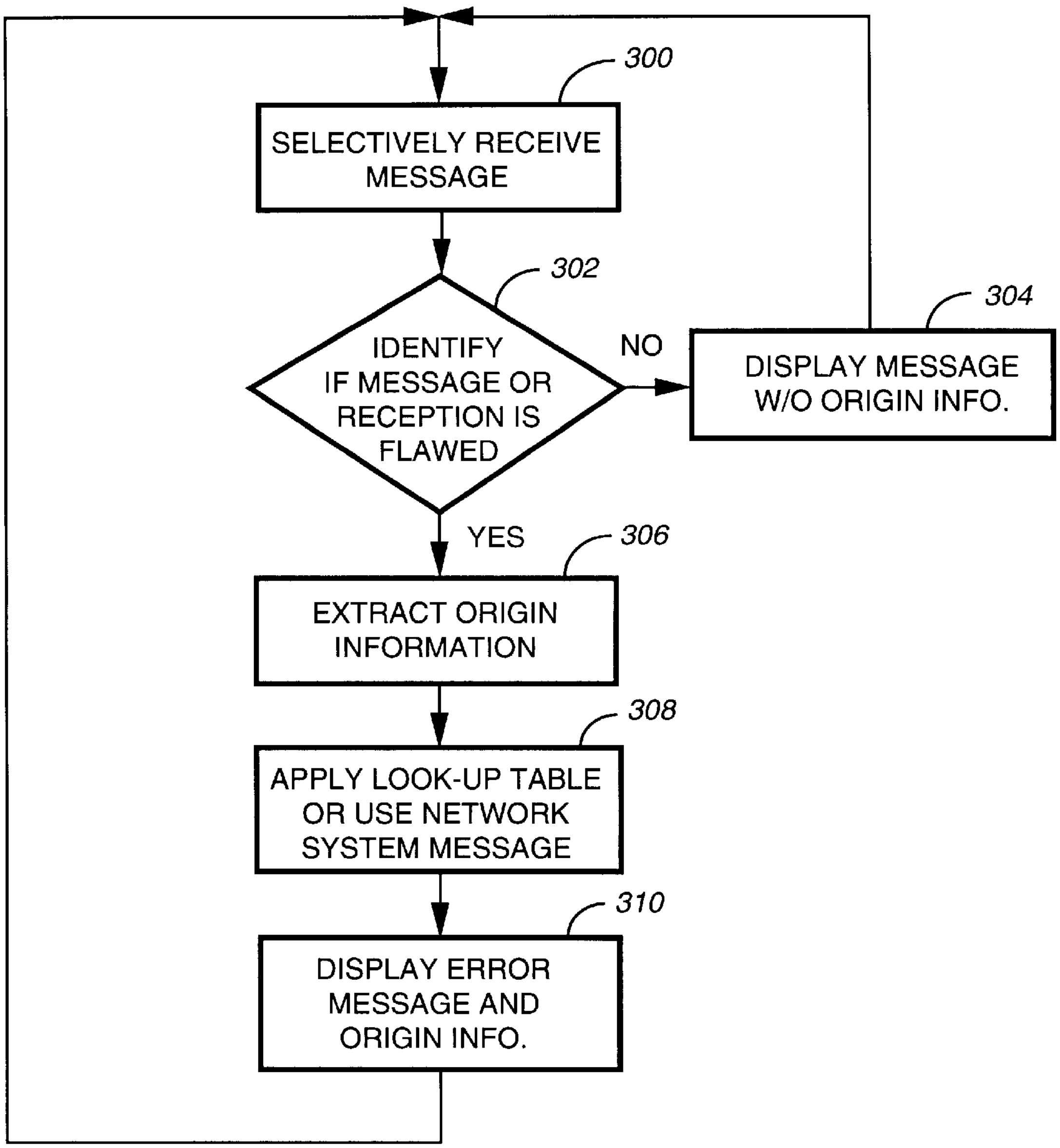
FIG. 3 is a block diagram illustrating a method for conveying message origination information in a selective call receiver.

Turning to FIG. 3, FIG. 3 is a block diagram illustrating a method consistent with the present invention for conveying origination information in a selective call receiver (in this case a pager). FIG. 3 illustrates a preferred group of steps and order of those steps for carrying out the present invention, however, it will be recognized that other steps and alternative ordering of the steps shown would merely be alternative ways to accomplish the invention disclosed herein. Whereas FIG. 2 illustrates a method consistent with the present invention from an overall system point of view, including the message delivery terminals, FIG. 3 illustrates a method consistent with the present invention focusing on the steps that occur within the selective call receiver itself. More particularly, at step 300 a selective call receiver, typically a portable pager, receives a paging message that is addressed for that particular pager. At step 302, the pager identifies, using various well known processes, whether the received message is flawed. At step 304, in response to the received message not being flawed, the message is displayed on the pager as usual. Alternatively, at step 306, in response to a flaw in message reception being identified at step 302, the pager extracts the origin information that was added to the message at step 202 in FIG. 2. This extracting is typically by means of a digital circuit in the pager's processor operating on the message that includes the origin information that has been decoded from the signal that the pager received. At step 308, the pager applies the origin information extracted from the message at step 306 to a look-up table residing in the memory of the pager. The origin information conveyed in the page may be two or three bits, enough to distinguish a particular message delivery terminal.

Alternatively, if the pager has the benefit of a broadcasted NID, then the origination information is typically a single bit, and that bit combined with the NID is used for the look up table. The look-up table typically holds more detailed information about the origin that corresponds to the nominal origination information (and in some cases the NID) that is added to the paging message. For example, the information in the look-up table may hold a corresponding name of the service provider and phone number. The look-up table has such information for each potential originating terminal/service provider. Furthermore, in some systems the NID is part of or has associated with it a Network System Message (NSM) which includes more detailed information regarding the service provider. For example, the NSM may have the name and phone number of the service provider. In such a system, rather than turn to an internal look-up table for detailed information on the service provider, the pager can obtain all of the detailed information from the broadcasted NSM. Hence, in such a system, at step 308 the pager uses the NSM rather than turning to a look-up table.

At step 310 the pager reports, in this case by displaying on the pagers display, a message indicating an error, i.e. that the received message is flawed, along with the more detailed origin information found in the look-up table. Following the step of displaying either at step 304 or 310, the method may return to step 300 as necessary for further paging.

Figure 4:
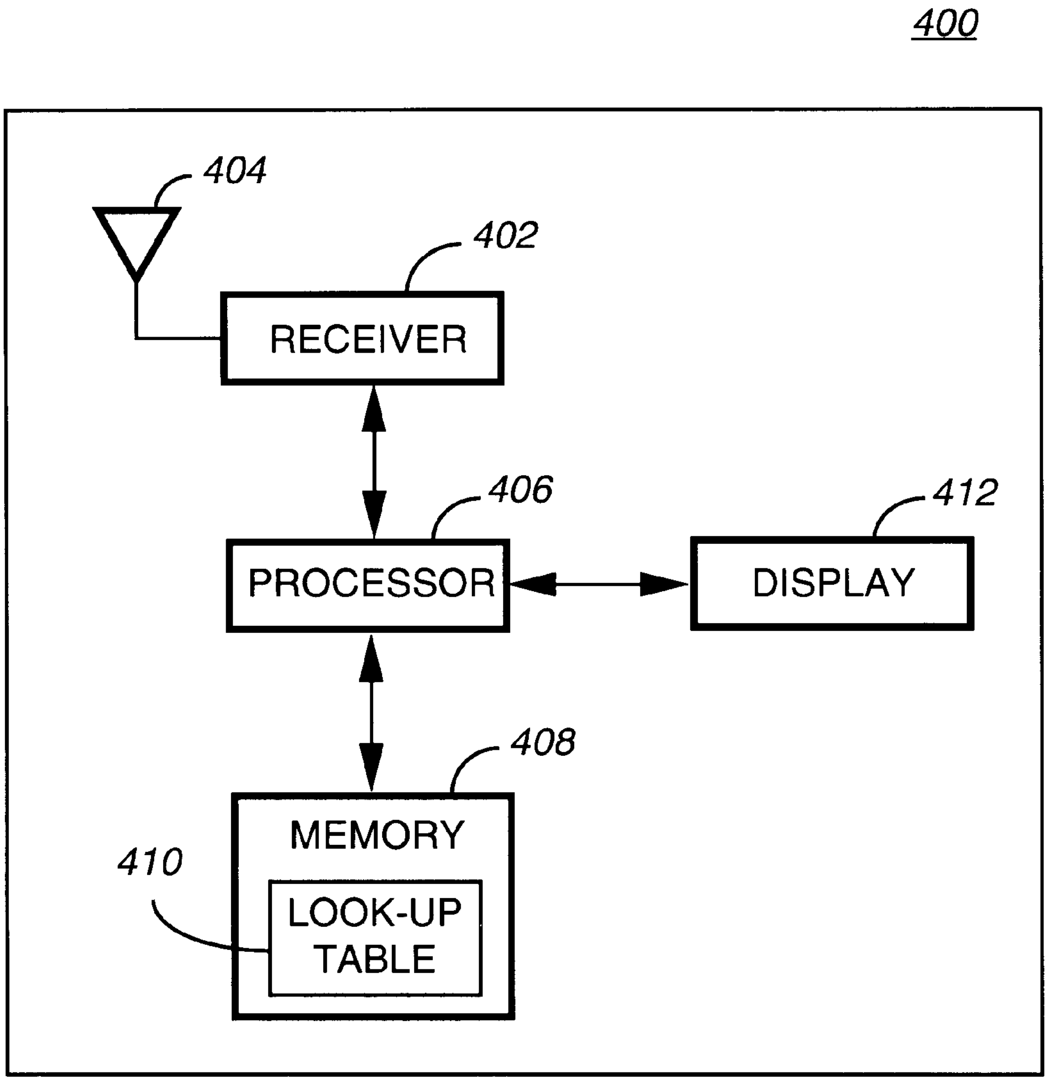
FIG. 4 is a schematic diagram of a selective call receiver capable of reporting message origination information.

Turning to FIG. 4, FIG. 4 illustrates schematically the selective call receiver 400, typically being a portable radio pager 400. Pager 400 comprises a receiving means 402 coupled to the antenna 404 of the pager. It will be recognized that receiver means 402 may be any conventional paging receiver or variation thereof. Receiving means 402 is coupled to processor 406. Processor 406 participates in decoding the radio frequency signal received by receiver 402. Processor 406 serves as an extracting means for extracting from the decoded message the information indicative of the origin of the page. Additionally, processor 406 serves as an identifying means for identifying whether there has been an error in reception of the page, and therefore whether the message is flawed. Processor 406 also serves as the reporting means for reporting in some instances whether the message received is flawed and in some instances the origin information. In the typical case the reporting involves displaying the information on display 412. Alternatively, reporting can be storing such information internally or transmitting such information for printing or storage or use elsewhere. It will be understood that such extracting means, identifying means, and reporting means may alternatively be embodied in virtually any type of integrated circuit, for example without limitation an advanced semi-conductor integrated circuit (ASIC), a hybrid device, a micro-controller, and combinations thereof, and further including or alternatively comprising software.

Pager 400 further includes memory 408 coupled to processor 406. Memory 408 includes a portion of memory dedicated to look-up table 410 which cross-references the nominal amount of origin information included in the transmitted page (and in some cases a NID) with more detailed information relating to each particular origin, the more detailed information including for example the name of a particular service provider and the phone number of that service provider. In this sense memory 408 serves as an identifying means identifying the particular service provider associated with the transmitted origination information. It should be recognized, however, that in a system where a NID and NSM are being broadcast, a look up table is not necessarily included because the pager obtains the detailed information on the local service provider as necessary from the NSM. Additionally, in such a system, the pager may have pre-stored in a memory the necessary detailed information (e.g. name and phone number) of its home service provider in the event that the origination information (i.e. the single bit indicating "home" or "local" origin) indicates that the message came from the home provider.

Pager 400 additionally includes displaying means 412 coupled to processor 406. In the embodiment illustrated, displaying means 412 comprises a conventional liquid crystal diode display, but it will be understood that displaying means 412 could be any display technology available. Display 412 is capable of displaying the information sent by the party initiating the page, along with a variety of other information including the origin information available in look-up table 410.

Figure 5:
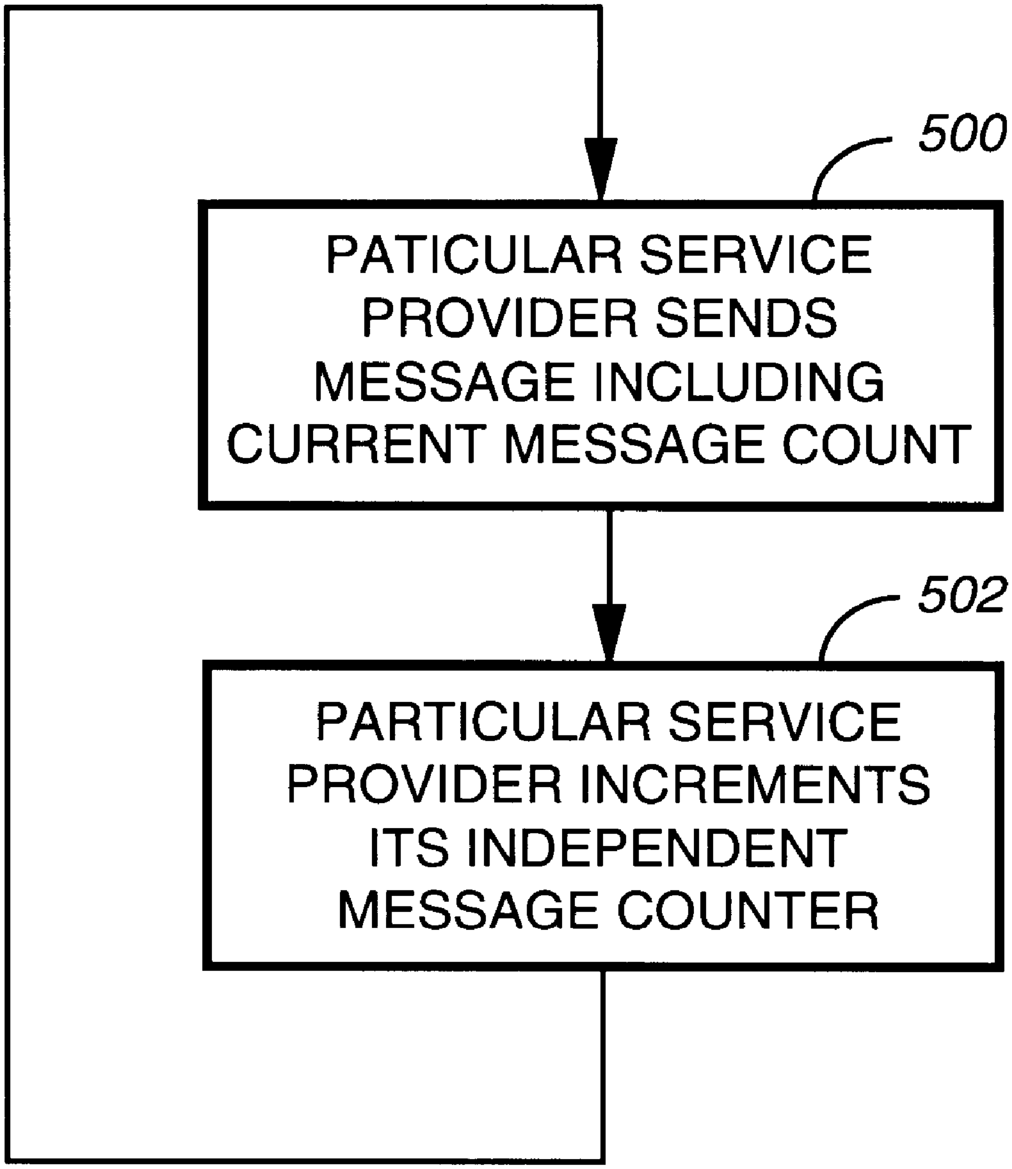
FIG. 5 is a block diagram illustrating a method for maintaining independent message counters for each service provider.

FIG. 5 illustrates the aspect of the present invention whereby the various service providers 130 (FIG. 1) maintain independent message counters. When calling in for message information that was received flawed by the pager, the subscriber can refer by number to the particular message needed. Additionally, if a subscriber receives two messages from the same service provider that are not consecutively ordered, then the subscriber will know that a message was entirely missed. FIG. 5 illustrates the steps involved. Note that FIG. 5 illustrates a preferred group of steps and order of those steps for carrying out this aspect of the present invention, however, it will be recognized that other steps and alternative ordering of the steps shown would merely be alternative ways to accomplish the invention disclosed herein. Referring to the figure, at step 500 the particular service provider sends a page including the current message count. At step 502 the particular service provider increments its message counter which is independent from the counters of the other service providers. If the target pager receives the page flawed, then the pager displays the detailed origin information along with the current message count for that page. Thus, the subscriber can contact the service provider and identify the proper page number for which the subscriber needs the message information. Following step 502, the process returns to step 500 as necessary to send further pages.

Consequently, what has been described is an inventive method and apparatus for conveying message origination information for a selective call receiver. Additionally, a scheme has been show for maintaining independent message counters for each service provider. Such method and apparatus are particularly advantageous in the context of a radio paging system wherein a subscriber is able to roam to various geographic areas and the message information to be sent to such subscriber may be handled by a variety of different message delivery terminals.

We claim:

1. A method for conveying message origination information in a selective call receiver comprising:

selectively receiving a first page including a selective call address, a first message, and first information indicative of a first origin of the first message;

identifying whether the first message is flawed; and selectively reporting, in response to the first message being flawed, an error message and the first origin of the first message, and in response to the first message not being flawed, the first message without the first origin information.

2. The method of claim 1, wherein the step of reporting comprises displaying second information indicative of the first origin of the first message.

3. The method of claim 2, further comprising the step of identifying the second information indicative of the first origin of the first message by using the first information indicative of the first origin of the first message and a look-up table, where in the second information indicative of the first origin of the first message includes a telephone number corresponding to the first origin of the first message.

4. The method of claim 2, further comprising the step of displaying message information absent the second information indicative of the first origin of the first message, in response to the first message not being flawed.

5. The method of claim 1, further comprising the steps of:

selectively receiving a second message including third information indicative of a second origin of the second message;

identifying whether the second message is flawed; and reporting, in response to the second message being flawed, the second origin of the second message.

6. The method of claim 1, wherein the step of selectively receiving comprises selectively receiving in a portable pager.

7. A selective call receiver comprising:

a receiver selectively receiving a first page including a selective call address, a message, and first information indicative of a first origin of the first message;

a processor coupled to the receiver, the processor identifying whether the message is flawed and extracting the first; and a display coupled to the processor, the display selectively displaying an error message and second information indicative of the first origin in response to the message being flawed, and the message without the second information in response to the message not being flawed.

8. The selective call receiver of claim 7, further comprising of a look-up table including information indicative of a plurality of message origins.

9. A selective call receiver comprising:

a receiving means for selectively receiving a first page including a selective call address, a first message, and first information indicative of a first origin of the first message;

a first identifying means coupled to the receiving means for identifying whether the first message is flawed;

an extracting means coupled to the first identifying means for extracting the first information; and a reporting means coupled to the first identifying means for selectively reporting, in response to the first message being flawed, an error message and the first origin of the first message, and in response to the first message not being flawed, the first message without the first origin.

10. The selective call receiver of claim 9, wherein the reporting means comprises a displaying means for displaying second information indicative of the first origin of the first message.

11. The selective call receiver of claim 10, further comprising a second identifying means coupled to the extracting means for identifying the second information indicative of the first origin of the first message by using the first information indicative of the first origin of the first message and a look-up table, wherein the second information indicative of the first origin of the first message includes a telephone number corresponding to the first origin of the first message.

12. The selective call receiver of claim 9, further comprising a displaying means coupled to the first identifying means for displaying, in response to the first message not being flawed, message information absent second information indicative of the first origin of the first message.

13. The selective call receiver of claim 9, wherein the selective call receiver comprises a portable pager.

14. A method for conveying message origination information to a user of a pager comprising the steps of:

receiving a first page including a selective call address, a message, and first information indicative of an origin of the message; and selectively displaying, in response to determining that an error occurred, an error message and second information indicative of the origin of the message, and in response to determining that no error occurred, the message without the second information.

15. The method of claim 14, further comprising the step of obtaining the second information indicative of the origin using a look-up table in a memory of the pager.

* * * * *